Patented July 14, 1936

2,047,189

UNITED STATES PATENT OFFICE 2,047,189

PROCESS FOR THE MANUFACTURE OF CELLULOSE DERIVATIVES

Paul Berger, St. Fons, and Auguste Florentin Bidaud, Serezin-du-Rhone, France, assignors to Societe des Usines Chimiques Rhone-Poulenc, Paris, France, a corporation of France No Drawing. Application July 22, 1933, Serial No. 681,758. In Great Britain November 22, 1932

10 Claims. (Cl. 260—152)

This invention relates to the preparation of cellulose derivatives and more particularly to the preparation of hydroxy-alkyl derivatives of cellulose.

It is known that under certain conditions, particularly under pressure or application of heat, that cellulose reacts with alkylene oxides, for example ethylene oxide, in the liquid or in the vapor state, giving rise to hydroxyalkylated derivatives. Attempts to facilitate this reaction have been made by adding to the reaction mass substances such as organic or inorganic bases or acids, these substances being capable of themselves reacting either on cellulose or on ethylene oxide. Under such circumstances it is possible to dispense with the application of heat and of pressure, the reaction which is exothermic often being vigorous and giving rise at times to undesirable secondary reactions. To this drawback there must be added the alteration which the cellulose may undergo, and the danger arising from the violent reaction. It has therefore been found necessary to moderate the reaction by suitable precautions such as dilution of the ethylene oxide with a liquid, or with gases or vapors, artificial cooling, etc., these precautions being taken together or separately whether the products necessary to the reaction are totally or only partially present in the reaction mixture from the beginning.

This invention has as an object the preparation of hydroxyalkyl derivatives of cellulose. A further object is the preparation of these derivatives in the absence of large amounts of bases. A still further object is the preparation of glycol cellulose. Other objects will appear hereinafter.

These objects are accomplished by the following invention, wherein hydroxyalkyl derivatives of cellulose are prepared by the action of alkylene oxides on cellulose in the presence of certain salts, namely organic or inorganic salts of alkali metals or of metals of the second group, or inorganic salts of organic bases.

The process of the invention may be carried out under very varied conditions with ethylene oxide in the liquid or vapor state in limited quantity or in excess. The reaction may also be made to take place in the presence of a liquid which may or may not be inert with respect to cellulose or the product formed. The diluent is preferably a solvent of ethylene oxide such as benzene, acetic acid, water, or ethylene glycol. In order to obtain a greater homogeneity of the products of the reaction, the action of ethylene oxide is preferably continued during a relatively long time. In general, a high temperature is to be avoided, it being in fact advantageous to operate at a moderate or even low temperature although below 0° C. the reaction is considerably slowed down. The temperature may be raised or lowered during the operation or it may be maintained constant.

The addition of the salts may be performed in any manner insuring a good distribution of the salt within the cellulosic material. The salt may be added as such or in the form of a solution in the mixture of reagents. If desired, means for stirring the mixture may be used. The cellulosic mass may also be impregnated with an aqueous or other solution of the salts before bringing the ethylene oxide into reaction. The salts may also be formed by chemical action in the presence of the cellulosic material. The impregnated cellulosic material may be utilized either directly or after being subjected to pressure and/or drying. A more regular impregnation may be obtained by means of a vacuum or of pressure.

The reaction products obtained by the present process may be utilized as such or subjected to subsequent treatments such as esterification and/or etherification. When subsequent treatments are resorted to, the primary elimination of the salts of the reaction product is not absolutely necessary. The presence of these salts may even be useful when they are capable of enhancing the desired transformation.

The following examples, which are not in any way limitative, illustrate the process of the invention.

Example 1

One hundred parts by weight of cellulose in the form of sheets of cellulose obtained by means of the bisulphite process, are immersed in a large excess of a solution of sodium chloride of about 5% concentration. The immersed sheets are then subjected to a series of pressings (or to the action of a vacuum) and finally their liquid constituent is extracted by pressure so that the mass is less than 300 parts. These sheets are then cut up in small pieces in a suitable crushing machine which may be closed. The crushing machine is then connected to a source of gaseous ethylene oxide so as to have and maintain in the apparatus an atmosphere of ethylene oxide at a pressure near atmospheric pressure. The vapors are allowed to act during more than 6, and preferably up to 30 hours, no important rise in the temperature, which is near 20–25° C., being observed. The cellulosic derivative obtained, which, if the duration of the treatment is sufficient, may be soluble in a 10% aqueous solution of caustic soda, is capable of being etherified, for example, benzylated or ethylated, by the methods used in the preparation of benzyl or ethyl cellulose, and gives products, the solution of which can be easily filtered.

*Example 2*

5 grams of bleached rags are impregnated below 20° C. with a 50% aqueous solution of zinc chloride and then dried by means of a current of dry air. The product is immersed in an excess of liquid ethylene oxide and left for one day at about 5° C. It is then washed in a hollander and dried in a centrifugal. The moist product forms, preferably below 0° C., a clear and viscous solution with an aqueous solution of caustic soda of about 10% concentration. This solution may be transformed into sheets by coagulation in a suitable bath for example in a sulphuric acid solution of a bisulphite.

*Example 3*

100 parts by weight of cotton cellulose having a low viscosity are ground with 200 parts of a 5% solution of magnesium perchlorate in anhydrous acetic acid and 600 parts of ethylene oxide. A gentle cohobation with brine refrigeration is maintained for 12 hours at about 15° C. and the temperature is then raised gradually to 40° C. to drive out the ethylene oxide by distillation. The cellulosic derivative obtained may be acetylated by adding directly to the reaction product 400 parts of acetic anhydride of 75% concentration. A clear solution is finally obtained, from which a product may be isolated by precipitation, washing, and drying. This product is capable of giving solutions of low viscosity, which are excellent bases for varnishes with the usual solvent such as methylene dichloride, acetone, and glycolformal, other solvents and/or nonsolvents being added if desired. The product may also be benzoylated, propionated, butyrated, etc. by appropriate modifications of the procedure above given for the acetylation.

*Example 4*

The solution of zinc chloride of Example 2 may be replaced by a solution of benzylpyridinium chloride in allowing liquid ethylene oxide to react with cellulose. Thus treated for 12 to 48 hours without preliminary drying of the cellulosic material, there is obtained a product soluble in caustic soda solution preferably cold.

The salts used in Examples 1, 3 and 4 may be replaced by potassium acetate. The products obtained have a great value either for immediate utilization or preferably after having been etherified or esterified. The cellulosic substance reacted with the alkylene oxide according to the process of the present invention may be pure, impure, modified or transformed cellulose, including sulphite cellulose, cotton linters and the like. The term cellulosic substance is also understood to include partially esterified cellulose, such as cellulose acetate, benzoate, butyrate, nitrate, and the like, as well as partially etherified cellulose such as ethyl cellulose, benzyl cellulose, methyl cellulose, allyl cellulose and the like.

Some salts, such as potassium carbonate, show only a small activity in accelerating the reaction. Others, on the contrary, are very efficient without giving rise to a too violent reaction. Sodium, potassium, and zinc chlorides, magnesium perchlorate, barium sulphocyanide, potassium acetate, and benzylpyridinium chloride are particularly suitable. Other useful salts include sodium acetate, zinc acetate, calcium sulphocyanide, benzyl-, butyl-, and ethylpyridinium chlorides and bromides, ethyl- and benzylpicolinium chlorides and bromides and ethyl- and benzyllutidinium chlorides and bromides. The salts used may be capable of acting with or of dissolving in one or more of the reagents present in the reaction.

The process has been described in its application to ethylene oxide but other vicinal alkylene oxides such as 1,2-propylene oxide, 1,2-butylene oxide, 2,3-butylene oxide, etc., may be used. Ethylene oxide is however preferred.

Among the advantages of the present process is the fact that the reaction is a very smooth one and easily obtained. There are obtained hereby cellulose derivatives of low degree hydroxylation which have a greater reactivity with respect to esterification or of etherification than the cellulosic material from which they are made. The products are also soluble at low temperature in dilute solutions of caustic liquors.

As many apparently widely different embodiments of this invention may be made without departing from the spirit and scope thereof, it is to be understood that we do not limit ourselves to the specific embodiments thereof except as defined in the appended claims.

We claim:

1. Process for the preparation of hydroxyalkyl derivatives of cellulosic substances, comprising reacting the cellulosic substance in the absence of bases with an alkylene oxide in the presence of a catalytic salt taken from the group consisting of bromides and chlorides of heterocyclic tertiary amines, alkali metal and zinc acetates and chlorides, calcium and barium sulfocyanides and magnesium perchlorate.

2. Process for the preparation of hydroxyalkyl derivatives of cellulose, comprising reacting cellulose in the absence of bases with an alkylene oxide in the presence of a catalytic salt taken from the group consisting of bromides and chlorides of heterocyclic tertiary amines, alkali metal and zinc acetates and chlorides, calcium and barium sulfocyanides and magnesium prechlorate.

3. Process for the preparation of glycol cellulose, comprising reacting cellulose in the absence of bases with ethylene oxide in the presence of a catalytic salt taken from the group consisting of bromides and chlorides of heterocyclic tertiary amines, alkali metal and zinc acetates and chlorides, calcium and barium sulfocyanides and magnesium perchlorate.

4. Process for the preparation of glycol cellulose, comprising reacting cellulose in the absence of bases with ethylene oxide in the presence of an acetate of an alkali metal.

5. Process for the preparation of glycol cellulose, comprising reacting cellulose in the absence of bases with ethylene oxide in the presence of potassium acetate.

6. Process for the preparation of glycol cellulose, comprising reacting cellulose with ethylene oxide in the presence of a chloride of a quaternary ammonium heterocyclic base and in the absence of bases.

7. Process for the preparation of glycol cellulose, comprising reacting cellulose with ethylene oxide in the presence of a quaternary alkyl chloride of a heterocyclic tertiary amine and in the absence of bases.

8. Process for the preparation of glycol cellulose, comprising reacting cellulose with ethylene oxide in the presence of benzylpyridinium chloride and in the absence of bases.

9. Prcess for the preparation of glycol cellulose comprising reacting cellulose with ethylene oxide in the presence of sodium chloride and in the absence of bases.

10. Process for the preparation of cellulose derivatives which comprises reacting a cellulosic substance in the absence of bases with an alkylene oxide in the presence of a catalytic salt taken from the group consisting of bromides and chlorides of heterocyclic tertiary amines, alkali metal and zinc acetates and chlorides, calcium and barium sulfocyanides and magnesium perchlorate, and esterifying the hydroxy derivative of cellulose thus formed by means of an esterifying agent.

PAUL BERGER.
AUGUSTE FLORENTIN BIDAUD.